(12) United States Patent
Paquet, Jr. et al.

(10) Patent No.: US 6,767,642 B2
(45) Date of Patent: Jul. 27, 2004

(54) PREPARATION AND USE OF CROSSLINKABLE ACRYLOSILANE POLYMERS CONTAINING VINYL SILANE MONOMERS

(75) Inventors: Donald A. Paquet, Jr., Troy, MI (US); Ding-Yu Chung, Rochester Hills, MI (US); Isidor Hazan, Southfield, MI (US)

(73) Assignee: E. I. du Pont Nemours and Company, Wilmington, DE (US)

( * ) Notice: Subject to any disclaimer, the term of this patent is extended or adjusted under 35 U.S.C. 154(b) by 0 days.

(21) Appl. No.: 10/095,951

(22) Filed: Mar. 11, 2002

(65) Prior Publication Data

US 2003/0170468 A1 Sep. 11, 2003

(51) Int. Cl.[7] .......................... B32B 25/20; C08F 30/08; C08F 230/08
(52) U.S. Cl. ............. 428/447; 106/287.13; 106/287.16; 525/479; 526/279; 526/319; 526/328; 526/328.5; 526/329.5; 538/25; 538/32
(58) Field of Search .................... 428/447; 106/287.13, 106/287.16; 525/479; 526/279, 319, 328.5, 328, 329.5; 528/25, 32

(56) References Cited

U.S. PATENT DOCUMENTS

| | | | |
|---|---|---|---|
| 3,966,687 A | * | 6/1976 | Ribba .......................... 526/261 |
| 4,603,064 A | | 7/1986 | Kania |
| 4,614,777 A | | 9/1986 | Kania |
| 5,063,114 A | | 11/1991 | Nambu et al. |
| 5,162,426 A | | 11/1992 | Hazan et al. |
| 5,244,959 A | * | 9/1993 | Hazan et al. ................ 524/504 |
| 5,252,660 A | * | 10/1993 | Hazan et al. ................ 524/504 |
| 5,288,771 A | * | 2/1994 | Takaya et al. .............. 523/201 |
| 5,459,205 A | | 10/1995 | Furukawa et al. |
| 5,705,561 A | * | 1/1998 | Kozakiewicz et al. ...... 524/730 |
| 5,886,125 A | | 3/1999 | Huybrechts |
| 6,080,816 A | * | 6/2000 | Gregorovich et al. ........ 525/100 |
| 6,261,642 B1 | * | 7/2001 | Nagai et al. .............. 427/407.1 |
| 6,362,301 B1 | * | 3/2002 | Bowe et al. .................. 528/32 |

FOREIGN PATENT DOCUMENTS

| | | |
|---|---|---|
| EP | 0 598 294 A2 | 5/1994 |
| WO | WO 99/19411 A1 | 4/1999 |

OTHER PUBLICATIONS

Copy of International Search Report dated Aug. 25, 2003 (PCT/US03/07355).

* cited by examiner

*Primary Examiner*—Jeffrey B. Robertson
(74) *Attorney, Agent, or Firm*—Steven C. Benjamin

(57) ABSTRACT

Acrylosilane polymers containing vinyl silanes are prepared by copolymerizing vinyl alkoxy silane monomers predominantly with, or in the alternative, only with acrylate monomers. The polymer so prepared can be used as the main component in the acid etch resistant solvent borne coating compositions and in particular in clear coating compositions for clear coat/color coat finishes for automobiles and trucks.

15 Claims, No Drawings

PREPARATION AND USE OF CROSSLINKABLE ACRYLOSILANE POLYMERS CONTAINING VINYL SILANE MONOMERS

BACKGROUND OF THE INVENTION

This invention relates to crosslinkable polymers, and more particularly to crosslinkable acrylosilane polymers containing vinyl silane monomers, and a process for preparing the same. It also relates to acid etch resistant high solids solvent borne coating compositions comprising a crosslinkable acrylosilane polymer containing a vinyl silane which can be used for finishing automobile and truck exteriors.

Coating compositions containing crosslinkable film-forming acrylosilane polymers that have excellent resistance to etching from acid rain and other environmental pollutants are described in U.S. Pat. No. 5,162,426 to Hazan et al. issued Nov. 10, 1992. Nowadays, these coatings are widely used for finishing the exteriors of automobile and truck bodies.

While such coatings function very well, the method described for their preparation provides no convenient way for incorporating much less expensive vinyl silane monomers such as vinyl alkoxy silanes into the acrylosilane polymer molecules. Vinyl alkoxy silanes confer certain advantages to these coatings which have gone unrealized up to now. U.S. Pat. No. 5,886,125 to Huybrechts issued Mar. 23, 1999 discloses crosslinkable copolymers comprising vinyl alkoxy silane monomers and vinyl esters of branched fatty acids. While these copolymers produce etch resistant films, it is desirable to obtain copolymers comprising vinyl alkoxy silane monomers without the use of vinyl esters of branched fatty acids.

Therefore, there is still a need for new chemistries and convenient methods to broaden the choice of silane monomers that can be used to optimize the performance of these coating compositions while at the same time significantly reducing their cost.

SUMMARY OF THE INVENTION

The present invention provides a process for preparing crosslinkable acrylosilane polymers useful in forming acid etch resistant coating compositions from vinyl alkoxy silane monomers, which comprises copolymerizing components A, B and optionally C (hereinafter defined) together in the proportions indicated herein.

The crosslinkable acrylosilane polymer compositions made by the above process also are a part of this invention. More particularly, the present invention provides crosslinkable polymeric compositions having a weight average molecular weight below about 40,000 derived from A, B and optionally C, wherein:

(A) is about 5 to 75% by weight, based on the weight of acrylosilane polymer, a vinyl alkoxy silane monomer represented by the general formula

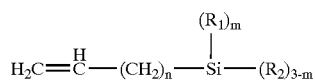

wherein $R_1$ is an aryl or alkyl group having 1 to 10 carbon atoms, $R_2$ is a hydrolysable group, m is 0 or 1, and n is 0 or a positive integer from 1 to 10;

(B) is about 25 to 95% by weight, based on the weight of the acrylosilane polymer, of one or more of polymerizable monomers selected from the group consisting of esters of acrylic acid; and, (C) is about 0 to 70% by weight, based on the weight of the acrylosilane polymer, of one or more ethylenically unsaturated monomers other than (a) and (b) selected from the group consisting of esters of methacrylic acid, styrenic monomers, and combinations thereof.

The polymer compositions of this invention give an excellent balance of solvent resistance, chemical resistance, hardness, flexibility and adherence to a variety of substrates at a much lower cost. More specifically, such compositions are particularly useful in formulating acid etch resistant solvent borne coating compositions used as automotive top coats and in particular clear coating compositions for clear coat/color coat finishes for automobiles and trucks. Also included within the scope of this invention are coating compositions formed from the above polymers and substrates coated with the coating compositions disclosed herein.

DETAILED DESCRIPTION OF THE INVENTION

The novel process of this invention provides a convenient way to incorporate vinyl alkoxy silane monomers into an acrylosilane polymer. The acrylosilane polymers so prepared can then be used as the main film-forming component in acid etch resistant coating compositions that are described in U.S. Pat. No. 5,162,426, previously mentioned. That description is incorporated by reference herein in its entirety.

The process of this invention comprises copolymerizing a vinyl alkoxy silane monomer (A) predominantly with acrylate monomers (B) and optionally with other ethylenically unsaturated comonomers (C) such as styrenic or methacrylate monomers. The term "acrylate" as used herein refers to esters of acrylic acid. The term "methacrylate" as used herein refers to esters of methacrylic acid. The term "styrenic" refers to unsubstituted styrene monomers or alkyl substituted styrene monomers having about 1–4 carbon atoms in the alkyl group.

In this invention, it should be understood that the amount of any additional comonomer (C) which is present should not be so great as to adversely affect the desirable polymerization properties such as the polymer conversion rate. Preferably, the weight percentage of any additional comonomer (C) present is not so great as to reduce the polymer conversion rate below about 90%, preferably not below 97%, and even more preferably not below 98–99% conversion. In a typical embodiment, the weight percentage of any additional comonomer (C) present is no greater then the weight percentage of the acrylate monomer (B) present. In one preferred embodiment, only monomers (A) and (B) are present. This ensures almost 100% conversion.

Previously, no convenient way existed to incorporate vinyl alkoxy silane monomers into the acrylosilane polymer, due to poor compolymerization with other monomers, resulting in poor conversion of monomer to polymer. Instead, it had been the standard practice to use (meth) acryloxy silane monomers, such as methacryloxy propyltrimethoxy silane, as the silane monomer. It has now surprisingly been found that when vinyl alkoxy silane is copolymerized predominantly with or, in the alternative, only with acrylate monomers, the conversion is good and the yield is high, thus providing a convenient method to incorporate vinyl alkoxy silanes into the polymer. The acrylosilane polymer so prepared can then be used as the main component in acid etch resistant coating compositions and in particular in clear coating compositions for clear coat/color coat finishes for automobiles and trucks.

Preferably, the acrylosilane polymer prepared in accordance with this invention is the polymerization product of about 5–75%, preferably 10–50%, by weight of ethylenically unsaturated vinyl alkoxy silane monomers and correspondingly about 25–95%, preferably 50–90%, by weight of ethylenically unsaturated acrylate monomers, and optionally 0–70%, preferably 0–40%, by weight of a different ethylenically unsaturated monomer selected from one or both of a styrenic and methacrylate monomer, based on the total weight of the acrylosilane polymer. Illustrative of the vinyl alkoxy silane monomers which can be used to prepare the acrylosilane polymer are represented by the general formula

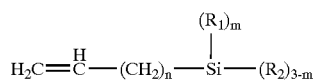

wherein $R_1$ is an aryl or alkyl group having 1 to 10 carbon atoms, $R_2$ is a hydrolysable group, m is 0 or 1, and n is 0 or a positive integer from 1 to 10. Preferably, m is 0, $R_2$ is $CH_3O$, and n is 0.

Typical examples of such vinyl alkoxy silanes are vinyl trimethoxy silane, vinyl methyldimethoxy silane, vinyl triethoxy silane, and vinyl tris (2-methoxyethoxy) silane, and the like.

The acrylate monomers which can be used to prepare the acrylosilane polymer include alkyl acrylates, where the alkyl groups have 1–12 carbon atoms, preferably 3–8 carbon atoms. Typical examples of such alkyl acrylates include methyl acrylate, ethyl acrylate, propyl acrylate, n-butyl acrylate, isobutyl acrylate, tert-butyl acrylate, pentyl acrylate, ethyl hexyl acrylate, nonyl acrylate, lauryl acrylate and the like. Cycloaliphatic acrylates can also be used, for example, such as isobornyl acrylate, trimethylcyclohexyl acrylate, t-butyl cyclohexyl acrylate and the like. Aryl acrylates also can be used, for example, such as benzyl acrylate. Polyacrylate monomers, (preferably diacrylate) can also be used. Typical examples of such monomers include 1,3 butanediol diacrylate, 1,4-butanediol diacrylate, 1,6-hexandediol diacrylate, cyclohexanedimethanol diacrylate, neopentyl glycol diacrylate, pentaerythritol triacrylate, trimethylolpropane triacrylate, diurethane diacrylates, urethane triacrylates. Other acrylate monomers can also be used, such as silane-functional acrylates, for example, acryloxy silanes. Of course, mixtures of the above-mentioned monomers are also suitable.

Optional component C includes alkyl methacrylate monomers such as methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Cycloaliphatic methacrylates also can be used such as trimethylcyclohexyl methacrylate, t-butyl cyclohexyl methacrylate, and the like. Aryl methacrylates also can be used such as benzyl methacrylate. In addition to alkyl methacrylates, minor amounts of other polymerizable monomers can be used in the acrylosilane polymer for the purpose of achieving the desired properties such as hardness, appearance mar resistance and the like. Exemplary of such other monomers are vinyl aromatics, and in particular, styrene, methyl styrene, and the like. However, for better conversion of vinyl silane to polymer, component C is not present.

The acrylosilane polymer can also, and preferably does, comprise hydroxy functional groups (preferably up to about 40% by weight, based on the weight of the polymer) which can be provided by hydroxy alkyl acrylates and methacrylates having 1–4 carbon atoms in the alkyl group such as hydroxy ethyl acrylate, hydroxy propyl acrylate, hydroxy butyl acrylate, hydroxy ethyl methacrylate, hydroxy propyl methacylate, hydroxy butyl methacrylate, and the like. For the same reasons mentioned above, preferred are the hydroxy alkyl acrylates. Particularly preferred polymer compositions have hydroxyl values (by titration; mg KOH/gram) from about 20 to 160. More preferred are values from about 50 to 130. Acid values are typically below about 20 mg KOH/gram.

The polymerization process of this invention can be, and preferably is, carried out by conventional free radical polymerization techniques. The conventional process is typically run in two steps. In the first step, vinyl alkoxy silane monomers are blended with an organic solvent or solvent blend in a conventional polymerization reactor and heated, preferably to reflux for ease of control, and in the second step to it is added the remaining monomers, additional solvent, and the usual amount of a conventional polymerization initiator such as azo- or peroxide initiators. The reaction is continued, preferably at reflux, with additions of monomers, solvents and initiators as needed, until an acrylosilane polymer is formed of the desired molecular weight.

The acrylosilane polymer prepared according to this invention preferably has a weight average molecular weight below about 40,000, preferably 1,000 to 30,000. All molecular weights herein are determined by GPC (gel permeation chromatography) using polystyrene as a standard.

Typical solvents that can be used to form the acrylosilane polymer are petroleum distillates; alcohols such as methanol, ethanol, n-propanol, isopropanol, butanol, sec-butanol, isobutanol, and propanol; ketones such as acetone, butanone, pentanone, hexanone, and methyl ethyl ketone; alkyl esters of acetic, propionic, and butyric acids, such as ethyl acetate, butyl acetate, and amyl acetate; ethers such as tetrahydrofuran, diethyl ether, and ethylene glycol and polyethylene glycol monoalkyl and dialkyl ethers such as cellosolves and carbitols; and, glycols such as ethylene glycol and propylene glycol; and any mixtures thereof.

Any of the commonly used azo or peroxy polymerization initiators can be used for preparation of the polymer provided it has solubility in the solution of the solvents and the monomer mixture, and has an appropriate half life at the temperature of polymerization. Suitable azo type initiators are 2,2'-azobis (isobutyronitrile), 2,2'-azobis (2,4-dimethylvaleronitrile), 2,2'-azobis (methylbutyronitrile), and 1,1'-azobis (cyanocyclohexane). Suitable peroxy based initiators are benzoyl peroxide, lauroyl peroxide, t-butyl peroxypivalate, t-butyl peroxy 2-ethylhexanoate and the like.

Consistent with the above mentioned components of the acrylosilane polymer, an example of an acrylosilane polymer useful herein contains the following constituents: about 10–90% by weight of one or more non-functional acrylates such as butyl acrylate, isobornyl acrylate and any mixtures thereof, about 5–30% by weight of a hydroxy functional alkyl acrylate, and about 5–50% by weight of the vinyl alkoxy silane. One such polymer that is presently preferred contains about 30% vinyl trimethoxysilane, 20% hydroxypropyl acrylate, 10% butyl acrylate, and 40% isobornyl acrylate.

The acrylosilane polymer prepared according to the process of the invention, which also forms part of this invention, is preferably used as the main film-forming component in acid etch resistant coating compositions.

Such coating compositions, which also form part of this invention, contain a combination of film forming components of an acrylosilane polymer, a non-aqueous dispersed polymer, referred to as a (NAD) polymer, and a crosslinking agent that in combination provides improved resistance to acid etching from environmental air pollution and is not prone to cracking typically associated with silane coatings.

These coating compositions are useful for finishing the exterior of automobile and truck bodies. Depending on its use, the present composition is capable of providing a coating which is durable, has excellent adhesion to basecoats, does not crack, does not deteriorate in terms of transparency under prolonged exposure to weather conditions, and imparts a superior glossy and attractive appearance for an extended period. Also, the coating composition offers a significant improvement over conventionally used coating compositions in terms of resistance to etching caused by environmental chemical attack. The coating composition is therefore capable of providing an automobile or truck with exterior finish that has high glamour and an attractive aesthetic appearance, including high gloss and DOI (distinctness of image), and is also resistant to loss of its luster and etching caused by environmental chemical attack.

A typical steel auto or truck body has several layers of coatings. The steel is typically first coated with an inorganic rust-proofing zinc or iron phosphate layer over which a primer coating is applied which typically is an electrocoated primer or can be a repair primer. A typical electrocoated primer comprises a cathodically deposited epoxy modified resin that is crosslinked with a polyisocyanate. A typical repair primer comprises an alkyd resin. Optionally, a primer surfacer can be applied over the primer coating to provide for better appearance and/or improved adhesion of the basecoat to the primer coat. A pigmented basecoat or colorcoat is next applied over the primer surfacer. A typical basecoat comprises a pigment, which may include metallic flakes in the case of a metallic finish, and polyester or acrylourethane as a film-forming binder. A clear topcoat (clearcoat) is then applied to the pigmented basecoat (colorcoat). The colorcoat and clearcoat are preferably applied to have thickness of about 0.1–3 mils and 1.0–5.0 mils, respectively. A coating composition of this invention, depending on the presence of pigments or other conventional components, may be used as a basecoat, clearcoat, or primer. However, a particularly preferred composition is useful as a clear topcoat to prevent environmental chemical attack to the entire finish. A clearcoat composition of the present invention may be applied over a basecoat composition of the present invention.

The film-forming portion of the coating composition of this invention, comprising polymeric components, is referred to as the "binder" or "binder solids" and is dissolved, emulsified or otherwise dispersed in an organic solvent or liquid carrier. The binder solids generally include all the normally solid polymeric non-liquid components of the total composition. Generally, catalysts, pigments, and non-polymeric chemical additives such as stabilizers are not considered part of the binder solids. Non-binder solids other than pigments usually do not amount to more than about 5% by weight of the composition. In this disclosure, the term binder includes the acrylosilane polymer, the NAD polymer, crosslinking agents and all other optional film-forming polymers.

The coating composition of the present invention suitably contains about 40–90% by weight of the binder and correspondingly about 10–60% by weight of an organic solvent or another liquid carrier. Preferably, the coating composition is a high solids composition that contains about 50–80% by weight of the binder and 20–50% by weight of a liquid carrier. The coating of the present invention is also preferably a low VOC coating composition which means a coating that includes less than 0.6 kilograms of organic solvent per liter (5 pounds per gallon) of the composition, as determined under the procedure provided in ASTM D3960. The binder of the coating composition preferably is a blend of about 20–80% by weight of the film-forming acrylosilane polymer, 10–40% by weight of a NAD polymer, about 10–70% by weight of a crosslinking agent. Preferred coating compositions are those wherein the binder is a blend of about 40–70% by weight of acrylosilane polymer, 10–30% by weight of NAD polymer, and 10–50% by weight of crosslinking agent.

The film-forming acrylosilane portion of the binder comprises the acrylosilane polymer mentioned above. Such polymers enable the use of much less expensive vinyl alkoxy silane monomers without adversely affecting the durability of the coating and its resistance to chemical and environmental weathering. Coating compositions can now be made that have high resistance to chemical and environmental attack, while at the same time reducing the cost of application.

Suitably, the acrylosilane polymers mentioned above are the sole means of acrylosilane polymers in this portion of the coating composition. Optionally, blends of the foregoing acrylosilane polymer and other acrylosilane polymers can be used. Specific examples of these acrylosilane polymers are disclosed in U.S. Pat. No. 5,162,426, which has been previously incorporated by reference.

In addition to the acrylosilane polymer, other film-forming and/or crosslinking solution polymers may be included in the present application. Examples include conventionally known acrylics, cellulosics, aminoplasts, urethanes, polyesters, epoxies or mixtures thereof.

One preferred optional film-forming polymer is a polyol, for example an acrylic polyol solution polymer of polymerized monomers. Such monomers may include any of the aforementioned alkyl acrylates and/or corresponding methacrylates and, in addition, any of the aforementioned hydroxy alkyl acrylates and/or corresponding methacrylates. Suitable alkyl acrylates are those listed above. Suitable alkyl methacrylates are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. The polyol polymer preferably has a hydroxyl number of about 50–200 and a weight average molecular weight of about 1,000–200,000 and preferably about 1,000–20,000.

To provide the hydroxy functionality in the polyol, up to about 90% preferably 20 to 50%, by weight of the polyol comprises hydroxy functional polymerized monomers. Suitable monomers include hydroxy alkyl acrylates and methacrylates, for example, such as the hydroxy alkyl acrylates listed hereinabove. Suitable hydroxy alkyl methacrylates are hydroxy ethyl methacrylate, hydroxy propyl methacrylate, hydroxy butyl methacrylate and the like.

Other polymerizable non-hydroxy-containing monomers may be included in the polyol polymer component, in an amount up to about 90% by weight, preferably 50 to 80%. Such polymerizable monomers include, for example, styrene, methylstyrene, acrylamide, acrylonitrile, methacrylonitrile, methacrylamide, methylol methacrylamide, methylol acrylamide, and the like, and mixtures thereof.

One example of an acrylic polyol polymer comprises about 10–20% by weight of styrene, 40–60% by weight of alkyl methacrylate or acrylate having 1–6 carbon atoms in the alkyl group, and 10–50% by weight of hydroxy alkyl acrylate or methacrylate having 1–4 carbon atoms in the alkyl group. One such polymer contains about 15% by weight styrene, about 29% by weight iso-butyl methacrylate, about 20% by weight 2-ethylhexyl acrylate, and about 36% by weight hydroxy propylacrylate.

A key component of the coating composition of this invention is, in addition to the above polymeric components, a non aqueous dispersed (NAD) polymer, also known as a microgel, a nonaquoeus latex, and a polymer colloid. The NAD polymer is characterized as a polymer particle dispersed in an organic media, which particle is stabilized by steric stabilization. Steric stabilization is accomplished by the attachment, commonly by adsorption, of a solvated polymeric or oligomeric layer at the particle medium interface. The problem of providing a steric barrier has been considered in two parts: first, the selection of the soluble polymer which comprises the solvate sheath surrounding each particle and, secondly, the method of attaching or anchoring this polymer to the particle surface. Typically the NAD polymers are block or graft copolymers in which one component is the soluble stabilizing portion and the other portion, often termed the anchor, is insoluble in the continuous phase and is adsorbed on or is absorbed into the disperse phase. To increase the stability of the dispersed polymer, particularly to strong solvents, or to ensure that the stabilizer is not desorbed or displaced, the anchor group may be covalently linked to the particle. This has been achieved by incorporating into the anchor group a reactive group, for example a glycidyl group which can react with a complementary group in the dispersed polymer, for example a carboxylic acid.

In the NAD polymers of this composition, the dispersed phase or particle, sheathed by a steric barrier, will be referred to as the "macromolecular polymer" or "core." The stabilizer forming the steric barrier, attached to this core, will be referred to as the "macromonomer chains" or "arms."

The NAD polymers solve the problem of cracking associated with silane coatings. These NAD polymers, to reduce cracking to the desired minimum, must be used in relatively higher amounts than when typically used for other purposes such as for flow control agents. The dispersed polymers are typically used in an amount varying from 10 to 60% by weight, preferably about 15 to 40%, more preferably 20 to 30% of the total binder in the composition. The ratio of silane compound to the dispersed polymer component in the composition suitably ranges from 5:1 to 1:2, preferably 4:1 to 1:1. This relatively high concentration of dispersed polymer in the composition is made possible by the presence of reactive groups in the arms of the dispersed polymer, which reactive groups make the polymers compatible with the continuous phase of the system.

The NAD polymer contains about 10–90% by weight, preferably 50–80%, based on the weight of the NAD polymer, of a high molecular weight core having a weight average molecular weight of about 50,000–500,000. The preferred average particle size is 0.1 to 0.5 microns. The arms, attached to the core, make up about 90–10% by weight, preferably 20–50%, of the NAD polymer, and have a weight average molecular weight of about 1,000–30,000, preferably 1000–10,000.

Preferably, the macromolecular core of the NAD polymer is comprised of polymerized ethylenically unsaturated monomers. Suitable monomers include styrene, alkyl acrylate or methacrylate, ethylenically unsaturated monocarboxylic acid, and/or silane containing monomers. Such monomers as methyl methacrylate contribute to a high Tg (transition glass temperature) NAD polymer, whereas such "softening" monomers as butyl acrylate or 2-ethylhexyl acrylate contribute to a low Tg dispersed polymer. Other optional monomers are hydroxyalkyl acrylates or methacrylates or acrylonitrile. It is noted that such functional groups as hydroxy can react with silane groups in the acrylosilane polymer to produce more bonding in the composition. If a crosslinked core is desired, allyl acrylate or allyl methacrylate, which crosslink with each other, can be used or an epoxy functional monomer such as glycidyl acrylate or methacrylate can be used, which can react with a monocarboxylic acid functional ethylenically unsaturated monomer to crosslink the core.

Or the core can contain silane functionality, for crosslinking purposes, which functionality may be provided by a small amount of one or more of the silane containing monomers mentioned above with respect to the film forming acrylosilane polymer. Suitably, the silane functionality is the primary or major means, preferably the sole means, of crosslinking in the core. Suitably about 2 to 10%, preferably about less than 5% of the monomers making up the macromolecular core are silane monomers capable of crosslinking between themselves. Thus, crosslinking occurs by siloxane bonding (—Si—O—Si—). This silane crosslinking enables the core to behave as a non-crosslinked polymer before cure for good flow during application, resulting in improved appearance. The core can crosslink during and after curing, upon exposure to humidity and heat during curing and/or exposure to humidity in the environment after curing. A further advantage of silane being present in the core is that the cured film does not blush when exposed to humidity, which blushing was found to occur without the presence of silane.

A preferred feature of the NAD polymers used in this invention is the presence of macromonomer arms which are reactive, that is these arms have numerous reactive groups, referred to a "crosslinking functionalities," which are adapted to react with the acrylosilane polymer of the present composition. It is not known with certainty what portion of the these functional groups do, in fact, react with the acrylosilane polymer, because of the numerous and complicated sets of reactions which may occur during baking and curing of the composition, especially if additional film-forming binders are present. However, it may be said that a substantial portion of these functionalities in the arms, preferably the majority thereof, do in actuality react and crosslink with the film-former of the composition. If additional film-forming polymers are present, for example, a polyol, then the arms may react with film forming polymers other than the acrylosilane polymer. Suitably, about 3 to 30% of the monomers which make up the macromonomer arms have reactive crosslinking functional groups. Preferably about 10 to 20% of the monomers have such reactive groups.

The arms of the NAD polymer should be anchored securely to the macromolecular core. For this reason, the arms preferably are anchored by covalent bonds. The anchoring must be sufficient to hold the arms to the NAD polymer after they react with the film-former polymer.

As indicated above, the arms or macromonomers of the NAD polymer serve to prevent the core from flocculating by forming what is referred to in the art as a steric barrier. The arms, typically in contrast to the macromolecular core, are capable, at least temporarily, of being solvated in the organic solvent carrier or media of the composition. They may therefore be in a chain-extended configuration and their crosslinking functional groups are therefore relatively readily available to reaction with the silane groups of the film forming silane containing polymer. Such arms suitably comprise about 5 to 30% by weight, preferably 10 to 20%, based on the weight of macromonomer, of polymerized ethylenically unsaturated hydroxy, epoxide, silane, acid, anhydride, isocyanate, amide, or other crosslinking functionality containing monomers, or combinations thereof, and about 70–95% by weight, based on the weight of the macromonomer, of at least one other polymerized ethylenically unsaturated monomer without such crosslinking functionality. Preferably the crosslinking functionality is a hydroxy, silane or epoxy containing monomer, since such reactive groups can be utilized in one package systems. When the crosslinking functionality is an acid, anhydride, or isocyanate, then a two package system, with the dispersed polymer in a first package and the acrylosilane in a second package, is generally required. Combinations of the above-mentioned crosslinking functional groups are also suitable, although it is noted that hydroxy and silane groups have limited compatibility and are preferably not on the same macromonomer chain.

As an example, the macromonomer arms attached to the core may contain polymerized monomers of alkyl methacrylate, alkyl acrylate, each having 1–12 carbon atoms in the alkyl group, as well as glycidyl acrylate or glycidyl methacrylate or ethylenically unsaturated monocarboxylic acid containing monomers for anchoring and/or crosslinking. Typically useful hydroxy containing monomers are hydroxy alkyl acrylates or methacrylates as described above.

A preferred composition for the NAD polymer that has hydroxy functionality comprises a core consisting of about 25% by weight hydroxy ethyl acrylate, about 4% by weight methacrylic acid, about 46.5% by weight methyl methacrylate, about 18% by weight methyl acrylate, about 1.5% by weight glycidyl methacrylate and about 5% styrene. The macromonomer attached to the core contains 97.3% by weight prepolymer and about 2.7% by weight glycidyl methacrylate, the latter for crosslinking or anchoring. A preferred prepolymer contains about 28% by weight butyl methacrylate, about 15% by weight ethyl methacrylate, about 30% by weight butyl acrylate, about 10% by weight hydroxyethyl acrylate, about 2% by weight acrylic acid, and about 15% by weight styrene.

The NAD polymer may be produced by conventionally known procedures. For example, it has been disclosed that such polymers may be produced by a process of dispersion free radical polymerization of monomers, in an organic solvent, in the presence of a steric stabilizer for the particles. The procedure has been described as basically one of polymerizing the monomers in an inert solvent in which the monomers are soluble but the resulting polymer is not soluble, in the presence of a dissolved amphiteric stabilizing agent. Such procedures have been extensively disclosed in both the patent and non-patent literature, for example, see the above cited references regarding dispersed polymers in general, or U.S. Pat. No. 4,220,679 and PAINT AND SURFACE COATING: THEORY AND PRACTICE, ed. R. Lambourne (Ellis Horwood Limited 1987). The macromonomer arms can be prepared by cobalt catalyzed special chain transfer (SCT) polymerization, group transfer polymerization (GTP), or free radical polymerization. The dispersed polymer solves the problem of cracking heretofore associated with silane coatings.

Optionally, the present coating composition may further include, particularly in conjunction with optional polyol polymer, an additional crosslinking agent, for example, any of the conventionally used alkylated melamine formaldehyde crosslinking agents. Typical alkylated melamine formaldehyde crosslinking agents that can be used are, for example, conventional monomeric or polymeric alkylated melamine formaldehyde resin that are partially or fully alkylated. One useful crosslinking agent is a methylated and butylated or isobutylated melamine formaldehyde resin that has a degree of polymerization of about 1–3. Generally, this melamine formaldehyde resin contains about 50% butylated groups or isobutylated groups and 50% methylated groups. Such crosslinking agents typically have a number average molecular weight of about 300–600 and a weight average molecular weight of about 500–1500. Examples of commercially available resins are Cymel® 1168, Cymel® 161, Cymel® 1158, Resimine® 4514 and Resimine® 354. Preferably, the crosslinking agent is used in the amount of about 5–50% by weight, based on the weight of the binder. Other contemplated crosslinking agents are urea formaldehyde, benzoquanamine formaldehyde and blocked polyisocyanates or compatible mixtures of any of the forgoing crosslinkers.

The coating composition described above can be formulated as a one-package system that has extended shelf life.

For a two-component system, a polyfunctional organic isocyanate can be used as the crosslinker without particular limitation so long as the isocyanate compound has at least two isocyanate groups in the one molecule. The preferable polyisocyanate compounds are isocyanate compounds having 2 to 3 isocyanate groups per molecule. Typical examples of polyfunctional organic isocyanate compounds are, for instance, 1,6-hexamethylene diisocyanate, isophorone diisocyanate, 2,4-toluene diisocyanate, diphenylmethane-4,4'-diisocyanate, dicyclohexylmethane-4,4'-diisocyanate, tetramethylxylidene diisocyanate, and the like. Trimers of diisocyanates also can be used such as the trimer of hexamethylene diisocyanate (isocyanurate) which is sold under the tradename Desmodur® N-3390, the trimer of isophorone diisocyanate (isocyanurate) which is sold under the tradename Desmodur® Z-4470 and the like. Polyisocyanate functional adducts can also be used that are formed from any of the forgoing organic polyisocyanate and a polyol. Polyols such as trimethylol alkanes like trimethylol propane or ethane can be used. One useful adduct is the reaction product of tetramethylxylidene diisocyanate and trimtheylol propane and is sold under the tradename of Cythane®) 3160. When the crosslinkable resin of the present invention is used in exterior coatings, the use of an aliphatic or cycloaliphatic isocyanate is preferable to the use of an aromatic isocyanate, from the viewpoint of weatherability and yellowing resistance.

A catalyst is typically added to catalyze the crosslinking of the silane moieties of the silane polymer with itself and with other components of the composition, including the dispersed polymer. Typical of such catalysts are dibutyl tin dilaurate, dibutyl tin diacetate, dibutyl tin dioxide, dibutyl tin dioctoate, tin octoate, aluminum titanate, aluminum chelates, zirconium chelate and the like. Tertiary amines and acids or combinations thereof are also useful for catalyzing silane bonding. Preferably, these catalysts are used in the amount of about 0.1 to 5.0%, based on the weight of the binder.

In addition, the coating composition may include a structured polymer, a STAR polymer, or a solvent reversible polymer (SRP).

To improve weatherability of a clear finish produced by the present coating composition, an ultraviolet light stabilizer or a combination of ultraviolet light stabilizers can be added in the amount of about 0.1–5% by weight, based on the weight of the binder. Such stabilizers include ultraviolet light absorbers, screeners, quenchers, and specific hindered amine light stabilizers. Also, an antioxidant can be added, in the about 0.1–5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference.

The composition may also include other conventional formulation additives such as flow control agents, for example, such as Resiflow® S (polybutylacrylate), BYK® 320 and 325 (high molecular weight polyacrylates); rheology control agents, such as fumed silica; water scavengers such as tetrasilicate, trimethyl orthoformate, triethyl orthoformate and the like.

When the present composition is used as a clearcoat (topcoat) over a pigmented colorcoat (basecoat) to provide a colorcoat/clearcoat finish, small amounts of pigment can be added to the clear coat to eliminate undesirable color in the finish such as yellowing.

The present composition also can be pigmented and used as the colorcoat, or as a monocoat or even as a primer or primer surfacer. The composition has excellent adhesion to a variety of substrates, such as previously painted substrates, cold rolled steel, phosphatized steel, and steel coated with conventional primers by electrodeposition. The present composition exhibits excellent adhesion to primers, for example, those that comprise crosslinked epoxy polyester and various epoxy resins, as well as alkyd resin repair primers. The present composition can be used to coat plastic substrates such as polyester reinforced fiberglass, reaction injection-molded urethanes and partially crystalline polyamides.

When the present coating composition is used as a basecoat, typical pigments that can be added to the composition include the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbazole violet, isoindolinones, isoindolones, thioindigo reds, benzimidazolinones, metallic flake pigments such as aluminum flake and the like.

The pigments can be introduced into the coating composition by first forming a mill base or pigment dispersion with any of the aforementioned polymers used in the coating composition or with another compatible polymer or dispersant by conventional techniques, such as high speed mixing, sand grinding, ball milling, attritor grinding or two roll milling. The mill base is then blended with the other constituents used in the coating composition.

Conventional solvents and diluents are used to disperse and/or dilute the above mentioned polymers to obtain the present coating composition. Typical solvents and diluents include toluene, xylene, butyl acetate, acetone, methyl isobutyl ketone, methyl ethyl ketone, methanol, isopropanol, butanol, hexane, acetone, ethylene glycol, monoethyl ether, VM and P naphtha, mineral spirits, heptane and other aliphatic, cycloaliphatic, aromatic hydrocarbons, esters, ethers and ketones and the like.

The coating composition can be applied by conventional techniques such as spraying, electrostatic spraying, dipping, brushing, flowcoating and the like. The preferred techniques are spraying and electrostatic spraying. After application, the composition is typically baked at 100–150° C. for about 15–30 minutes to form a coating about 0.1–3.0 mils thick. When the composition is used as a clearcoat, it is applied over the colorcoat which may be dried to a tack-free state and cured or preferably flash dried for a short period before the clearcoat is applied. The colorcoat/clearcoat finish is then baked as mentioned above to provide a dried and cured finish.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

Upon curing of clear topcoat compositions of the present invention, a portion of the silane-containing polymer may migrate to and stratify within the top portion of the clearcoat, particularly when the silane polymer is used in combination with a polyol, so as to produce a durable, weather-resistant clearcoat. Such stratification has been shown by electron scanning chemical analysis (ESCA) of a cross section of the cured layer of topcoat.

The coating composition can be formulated as a two-component package system or a one-package system that has extended shelf life.

The following examples illustrate the invention. All parts and percentages are on a weight basis unless otherwise indicated. Al molecular weights disclosed herein are determined by GPC using a polystyrene standard.

EXAMPLES

Example 1

Preparation of a Polymer Containing Vinyl Silane and Acrylate Only

The following constituents were charged to a 12-liter reaction flask equipped with a heating mantle, a reflux condenser, and stirrer, a thermocouple, a nitrogen inlet, and an addition funnel:

|  | Parts by Weight |
|---|---|
| Portion 1 | |
| Aliphatic solvent (Solvesso ®100 from Exxon) | 927 |
| n-Butanol | 309 |
| Vinyltrimethoxy silane (Silquest ® A171 by Crompton) | 1854 |
| Portion 2 | |
| Isobornyl acrylate (IBOA, Sipomer ® HP from Rhodia) | 2473 |
| Hydroxypropyl acrylate (HPA, Bisomer ® HPA from Laporte Performance Chemicals) | 1236 |
| Butyl acrylate (BA) | 618 |
| n-Butanol | 618 |
| Tert-butyl peroxy 2-ethylhexanoate (Luperox ® 26 from Atofina) | 185 |
| Portion 3 | |
| Aliphatic solvent (Solvesso ® 100 from Exxon) | 216 |
| Tert-butyl peroxy 2-ethylhexanoate (Luperox ® 26 from Atofina) | 62 |
| Total | 8500 |

Portion 1 was charged into the reaction flask and heated to its reflux temperature under nitrogen. Portion 2 was added over a 330 minute period while maintaining the reaction mixture at the reflux temperature. Portion 3 was then added and the reaction mixture was held at its reflux for an additional 30 minutes.

The resulting polymer solution had a weight solids of 75.6% (which represents virtually 100% conversion), a weight average molecular weight of about 5,200, and contains the following constituents A171/IBOA/HPA/BA in a weight ratio of 30/40/20/10.

Example 2

Preparation of a Polymer Containing Vinyl Silane, Acrylate and Diacrylate

The following constituents were charged to a 12-liter reaction flask equipped with a heating mantle, a reflux condenser, and stirrer, a thermocouple, a nitrogen inlet, and an addition funnel:

|  | Parts by Weight |
|---|---|
| Portion 1 | |
| Aliphatic solvent (Solvesso ® 100 from Exxon) | 375 |
| n-Butanol | 125 |
| Vinyltrimethoxy silane (Silquest ® A171 by Crompton) | 500 |
| Portion 2 | |
| Isobornyl acrylate (IBOA, Sipomer ® HP from Rhodia) | 1125 |
| Hydroxypropyl acrylate (HPA, Bisomer ® HPA from Laporte Performance Chemicals) | 500 |
| 1,6-Hexanediol diacrylate (HDODA) | 50 |
| Butyl acrylate (BA) | 325 |
| n-Butanol | 250 |
| Tert-butyl peroxy 2-ethylhexanoate (Luperox ® 26 from Atofina) | 75 |
| Portion 3 | |
| Aliphatic solvent (Solvesso ® 100 from Exxon) | 87.5 |

-continued

|  | Parts by Weight |
|---|---|
| Tert-butyl peroxy 2-ethylhexanoate (Luperox ® 26 from Atofina) | 25 |
| Total | 3437.5 |

Portion 1 was charged into the reaction flask and heated to its reflux temperature under nitrogen. Portion 2 was added over a 360 minute period while maintaining the reaction mixture at the reflux temperature. Portion 3 was then added over 60 minutes and the reaction mixture was held at its reflux for an additional 30 minutes.

The resulting polymer solution had a weight solids of 75.6% (which represents virtually 100% conversion), a weight average molecular weight of about 15,000, and contains the following constituents A171/IBOA/HPA/BA/HDODA in a weight ratio of 20/45/20/13/2

Examples 3–11

Preparation of Polymers Containing Vinyl Silane, Acrylate and Varying Amounts of Methacrylate and/or Styrene Monomers For each polymer tested, Portion 1 as set forth below in the Table was charged into a reaction flask equipped as above and heated to its reflux temperature under nitrogen. Portion 2 indicated below was then added over a 360 minute period while maintaining the reaction mixture at the reflux temperature. Portion 3 was then added over 60 minutes and the reaction mixture was held at its reflux for an additional 30 minutes. The Examples show that conversion is reduced when significant amounts of styrenic or methacrylate monomers are used as comonomers with vinyl alkoxy silane and acrylate monomers. Good conversion, however, is obtained throughout this series.

|  | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|
| Portion 1 | | | | | | | | | |
| Solvesso ® 100 | 375 | 375 | 375 | 375 | 375 | 375 | 375 | 375 | 375 |
| n-Butanol | 125 | 125 | 125 | 125 | 125 | 125 | 125 | 125 | 125 |
| Silguest ® A171 | 500 | 500 | 500 | 500 | 500 | 500 | 500 | 500 | 500 |
| Portion 2 | | | | | | | | | |
| Sipomer ® HP, IBOA | 1000 | 875 | 750 | 625 | 875 | 500 | 250 | — | 750 |
| STY | — | 125 | 250 | 375 | — | — | — | — | 125 |
| IBMA (Isobutyl methacrylate) | — | — | — | — | 125 | 500 | 1000 | 1500 | 125 |
| Bisomer ® HPA | 500 | 500 | 500 | 500 | 500 | 500 | 500 | 500 | 500 |
| BA | 500 | 500 | 500 | 500 | 500 | 500 | 250 | — | 500 |
| Butanol | 250 | 250 | 250 | 250 | 250 | 250 | 250 | 250 | 250 |
| Luperox ® 26 | 75 | 75 | 75 | 75 | 75 | 75 | 75 | 75 | 75 |
| Portion 3 | | | | | | | | | |
| Solvesso ® 100 | 87.5 | 87.5 | 87.5 | 87.5 | 87.5 | 87.5 | 87.5 | 87.5 | 87.5 |
| Luperox ® 26 | 25 | 25 | 25 | 25 | 25 | 25 | 25 | 25 | 25 |
| Solids (%) | 77 | 73 | 70 | 70 | 75 | 76 | 75 | 73 | 73 |
| Conversion (%) | 100 | 97 | 90 | 90 | 100 | 100 | 100 | 97 | 97 |
| Viscosity | Y +⅓ | X −½ | W +½ | Y | X −⅓ | X | W | Y +½ | X +½ |

Example 12

Preparation of a Clearcoat Containing a Vinyl Silane Copolymer

A phosphated steel panel that had been electrocoated with an electrocoating primer was sprayed and coated with a conventional solvent-bone black base coating composition to form a basecoat about 0.5–1.0 mil thick. A clearcoat paint formulated with the copolymer of Example 1 was applied "wet-on-wet" over the black basecoat to form a clearcoat layer about 1.5–2.5 mil thick. The panel was fully cured by baking for 30 minutes at about 140° C. and had excellent appearance. The clear coating composition also exhibited comparable acid etch resistance to clear coatings made with conventional acrylosilane polymers and significantly better acid etch resistance than clear coatings made without silane polymers.

Various modifications, alterations, additions or substitutions of the component of the compositions of this invention will be apparent to those skilled in the art without departing from the spirit and scope of this invention. This invention is not limited by the illustrative embodiments set forth herein, but rather is defined by the following claims.

What is claimed is:

1. A crosslinkable acrylosilane polymer composition having a weight average molecular weight below about 40,000 and a hydroxyl value from about 20 to 160, prepared by polymerizing a mixture of monomers consisting of A, B and optionally C, wherein:
  (A) is about 5 to 75% by weight, based on the weight of the acrylosilane polymer, of a vinyl alkoxy silane monomer represented by the general formula

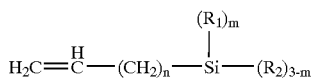

wherein $R_1$ is an aryl or alkyl group having 1 to 10 carbon atoms, $R_2$ is a hydrolysable group, m is 0 or 1, and n is 0 or a positive integer from 1 to 10;
  (B) is about 25 to 95% by weight, based on the weight of the acrylosilane polymer, of one or more of polymerizable monomers selected from the group consisting of esters of acrylic acid; and
  (C) is about 0 to 70% by weight, based on the weight of the acrylosilane polymer, of ethylenically unsaturated copolymerizable monomers other than (A) and (B) selected from the group consisting of styrenic monomers, esters of methacrylic acid, and mixtures thereof,
  with the proviso that when any additional comonomer (C) is present, the weight percentage of any such comonomer is not so great as to reduce the polymer conversion rate below 90%, determined on a percent weight solids basis.

2. The composition of claim 1 wherein the acrylosilane polymer has a hydroxyl value from about 20 to 160 and an acid value below about 20.

3. The composition of claim 1 wherein the acrylosilane polymer is free of ethylenically unsaturated monomers other than (A) and (B).

4. The composition of claim 1, wherein the vinyl alkoxy silane monomer used in (A) is vinyl trimethoxy silane.

5. A process for preparing acrylosilane polymers containing vinyl alkoxy silane monomers and having a hydroxyl value from about 20 to 160, which consists of copolymerizing A with B and optionally C, wherein:
  (A) is about 5 to 75% by weight, based on the weight of the acrylosilane polymer, of vinyl alkoxy silane monomers represented by the general formula

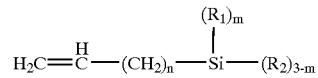

wherein $R_1$ is an aryl or alkyl group having 1 to 10 carbon atoms, $R_2$ is a hydrolysable group, m is 0 or 1, and n is 0 or a positive integer from 1 to 10;
  (B) is about 25 to 95% by weight, based on the weight of the acrylosilane polymer, of monomers selected from the group consisting of esters of acrylic acid, and
  (C) is about 0 to 70% by weight, based on the weight of the acrylosilane polymer, of ethylenically unsaturated monomers other than (A) and (B) selected from the group consisting of styrenic monomers, esters of methacrylic acid and mixtures thereof,
  with the proviso that when any additional comonomer (C) is present, the weight percentage of any such comonomer is not so great as to reduce the polymer conversion rate below 90%, determined on a percent weight solids basis.

6. The process of claim 5 wherein the acrylosilane polymer has a hydroxyl value between 20 and 160 and an acid value below 20.

7. The process of claim 5, wherein the vinyl alkoxy silane monomer used in (A) is vinyl trimethoxy silane.

8. The process of claim 5, wherein ethylenically unsaturated monomers other than (A) and (B) are not present.

9. A coating composition containing the polymer of claim 1.

10. A coating composition containing about 40–90% by weight of film forming binder and 10–60% by weight of an organic liquid carrier; wherein the binder contains:
  (i) about 20–80% by weight, based on the weight of the binder, of an acrylosilane polymer having a hydroxyl value from about 20 to 160 and consisting of
    (A) about 5–75% by weight, based on the weight of the acrylosilane polymer, of polymerized vinyl alkoxy silane monomers represented by the general formula

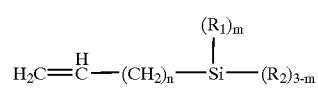

wherein $R_1$ is an aryl or alkyl group having 1 to 10 carbon atoms, $R_2$ is a hydrolysable group, m is 0 or 1, and n is 0 or a positive integer from 1 to 10;
    (B) about 25–95% by weight, based on the weight of the acrylosilane polymer, of polymerized monomers selected from the group consisting of esters of acrylic acid; and
    (C) about 0–70% by weight, based on the weight of the acrylosilane polymer, of polymerized monomers selected from ethylenically unsaturated monomers other than (A) and (B) selected from one or both of styrenic monomers and esters of methacrylic acid and the polymer has a weight average molecular weight of about 1,000–30,000 with the proviso that when any additional comonomer (C) is present, the weight percentage of any such comonomer is not so great as to reduce the polymer conversion rate below 90%, determined on a percent weight solids basis;

(ii) about 10–40% by weight, based on the weight of the binder, of a non-aqueous dispersed polymer having
  (A) a macromolecular core having a weight average molecular weight of about 50,000–500,000, and
  (B) attached to the macromolecular core, a plurality of macromonomer chains having a weight average molecular weight of about 1,000–30,000 of 5–30% by weight, based on the weight of the macromonomer, of polymerized ethylenically unsaturated monomers which have functional groups selected from the group consisting of epoxide, anhydride, isocyanate, silane, acid, hydroxy, amide or any combination of these groups; and about 70–95% by weight, based on the weight of the macromonomer, of at least one other polymerized ethylenically unsaturated monomer without a crosslinking functionality; and
(iii) about 10–70% by weight, based on the weight of the binder, of a crosslinking agent selected from one or both of an isocyanate and melamine crosslinker.

11. A substrate coated with the composition of claim 10.

12. An automobile or truck top coated with the composition of claim 10.

13. The composition of claim 1 wherein when any additional comonomer (C) is present, the weight percentage of any such comonomer is not so great as to reduce the polymer conversion rate below 97%, determined on a percent weight solids basis.

14. The process of claim 5 wherein when any additional comonomer (C) is present, the weight percentage of any such comonomer is not so great as to reduce the polymer conversion rate below 97%, determined on a percent weight solids basis.

15. The coating composition of claim 10 wherein when any additional comonomer (C) is present in component (i), the weight percentage of any such comonomer is not so great as to reduce the polymer conversion rate below 97%, determined on a percent weight solids basis.

* * * * *